United States Patent
Dorovsky

(10) Patent No.: US 8,362,782 B2
(45) Date of Patent: Jan. 29, 2013

(54) RESONANCE METHOD FOR MEASURING WATER-OIL RATIO, CONDUCTIVITY, POROSITY, PERMEABILITY AND ELECTROKINETIC CONSTANT IN POROUS FORMATIONS

(75) Inventor: Vitaly Nikolaevich Dorovsky, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 312 days.

(21) Appl. No.: 12/934,865

(22) PCT Filed: May 4, 2009

(86) PCT No.: PCT/RU2009/000211
§ 371 (c)(1),
(2), (4) Date: Sep. 27, 2010

(87) PCT Pub. No.: WO2010/128876
PCT Pub. Date: Nov. 11, 2010

(65) Prior Publication Data
US 2011/0050234 A1    Mar. 3, 2011

(51) Int. Cl.
*G01V 3/08* (2006.01)
*G01V 3/00* (2006.01)
*G01V 1/00* (2006.01)

(52) U.S. Cl. ............. 324/346; 324/303; 367/35
(58) Field of Classification Search .......... 324/303, 324/346; 367/35
See application file for complete search history.

(56) References Cited

U.S. PATENT DOCUMENTS

| | | | |
|---|---|---|---|
| 3,321,625 A | | 5/1967 | Wahl |
| 4,682,308 A | * | 7/1987 | Chung ............ 367/31 |
| 4,953,399 A | | 9/1990 | Fertl et al. |
| 5,452,761 A | | 9/1995 | Beard et al. |
| 7,500,539 B1 | | 3/2009 | Dorovsky et al. |
| 2008/0247270 A1 | | 10/2008 | Tabarovsky et al. |
| 2009/0058415 A1 | * | 3/2009 | Dorovsky et al. ........ 324/303 |

* cited by examiner

*Primary Examiner* — Bot Ledynh
(74) *Attorney, Agent, or Firm* — Mossman Kumar & Tyler PC

(57) ABSTRACT

A shear wave is generated at a borehole wall. A static magnetic field is applied with a radial direction and an oscillating magnetic field is applied tangential to the borehole wall. The frequency of the oscillating field is varied until a resonance condition occurs. Motion of the formation under resonance provides an indication of a resistivity property of the earth formation.

15 Claims, 3 Drawing Sheets

RESONANCE METHOD FOR MEASURING WATER-OIL RATIO, CONDUCTIVITY, POROSITY, PERMEABILITY AND ELECTROKINETIC CONSTANT IN POROUS FORMATIONS

BACKGROUND OF THE PRESENT DISCLOSURE

1. Field of the Disclosure

The present disclosure relates generally to geological exploration in wellbores. More particularly, the present disclosure describes an apparatus, a machine-readable medium, and a method useful for using acoustic measurements made in magnetic fields for determining formation properties.

2. Description of the Related Art

A variety of techniques are currently utilized in determining the presence and estimating quantities of hydrocarbons (oil and gas) in earth formations. These methods are designed to determine formation parameters, including, among other things, the resistivity, porosity, and permeability of a rock formation surrounding a wellbore drilled for recovering the hydrocarbons. Typically, the tools designed to provide the desired information are used to log the wellbore. Much of the logging is done after the wellbores have been drilled.

Extensive work has been done in the determination of formation properties using nuclear magnetic resonance (NMR) methods. In the NMR method, a magnetic field is applied to formation which aligns the nuclear spins in a direction parallel to the magnetic field. The formation is then pulsed with a pulsed radio frequency magnetic field orthogonal to the static magnetic field which changes the direction of the nuclear spins. Signals resulting from precession of the nuclear spins are measured, and with proper selection of the pulsing parameters, various formation properties such as porosity and diffusivity can be measured. There has been little recognition of measurements other than NMR measurements that can be made in magnetic fields. U.S. patent application Ser. No. 11/696,461 of Tabarovsky et al., having the same assignee as the present disclosure and the contents of which are incorporated herein by reference, teaches and claims a method of determining a resistivity parameter of an earth formation through casing using acoustic measurements in crossed-magnetic fields. U.S. patent application Ser. No. 11/847,920 of Dorovsky et al., having the same assignee as the present disclosure and the contents of which are incorporated herein by reference discloses the determination of formation properties in crossed-magnetic fields. The present disclosure is related to determination of other properties using measurements in magnetic fields.

SUMMARY OF THE DISCLOSURE

One embodiment of the disclosure is a method of estimating a resistivity property of an earth formation. The method includes generating a shear wave in an earth formation at an interface between a fluid and the formation; generating a static magnetic field having a first direction at the interface; varying a frequency of a second magnetic field having a direction different from the first direction until a resonance condition is satisfied in the formation; and using at least one measurement of motion of the earth formation to provide the estimate of the resistivity property.

Another embodiment of the disclosure is an apparatus configured to estimate a resistivity property of an earth formation. The apparatus includes: a transducer configured to generate a shear wave in an earth formation at an interface between a fluid and the formation; a magnet arrangement configured to generate a static magnetic field at the interface having a first direction and generate a time varying magnetic field at the interface in a second direction different from the first direction; and a processor configured to vary a frequency of the time-varying magnetic field until a resonance condition is satisfied in the formation use at least one measurement of motion of the earth formation to provide the estimate of the resistivity property.

BRIEF DESCRIPTION OF THE DRAWINGS

The present claimed subject matter may be better understood by reference to one or more of these drawings wherein:

DETAILED DESCRIPTION OF THE DISCLOSURE

The present invention is discussed with reference to specific logging instruments that may form part of a string of several logging instruments for conducting wireline logging operations. It is to be understood that the choice of the specific instruments discussed herein is not to be construed as a limitation and that the method of the present invention may also be used with other logging instruments as well.

Figure 1:
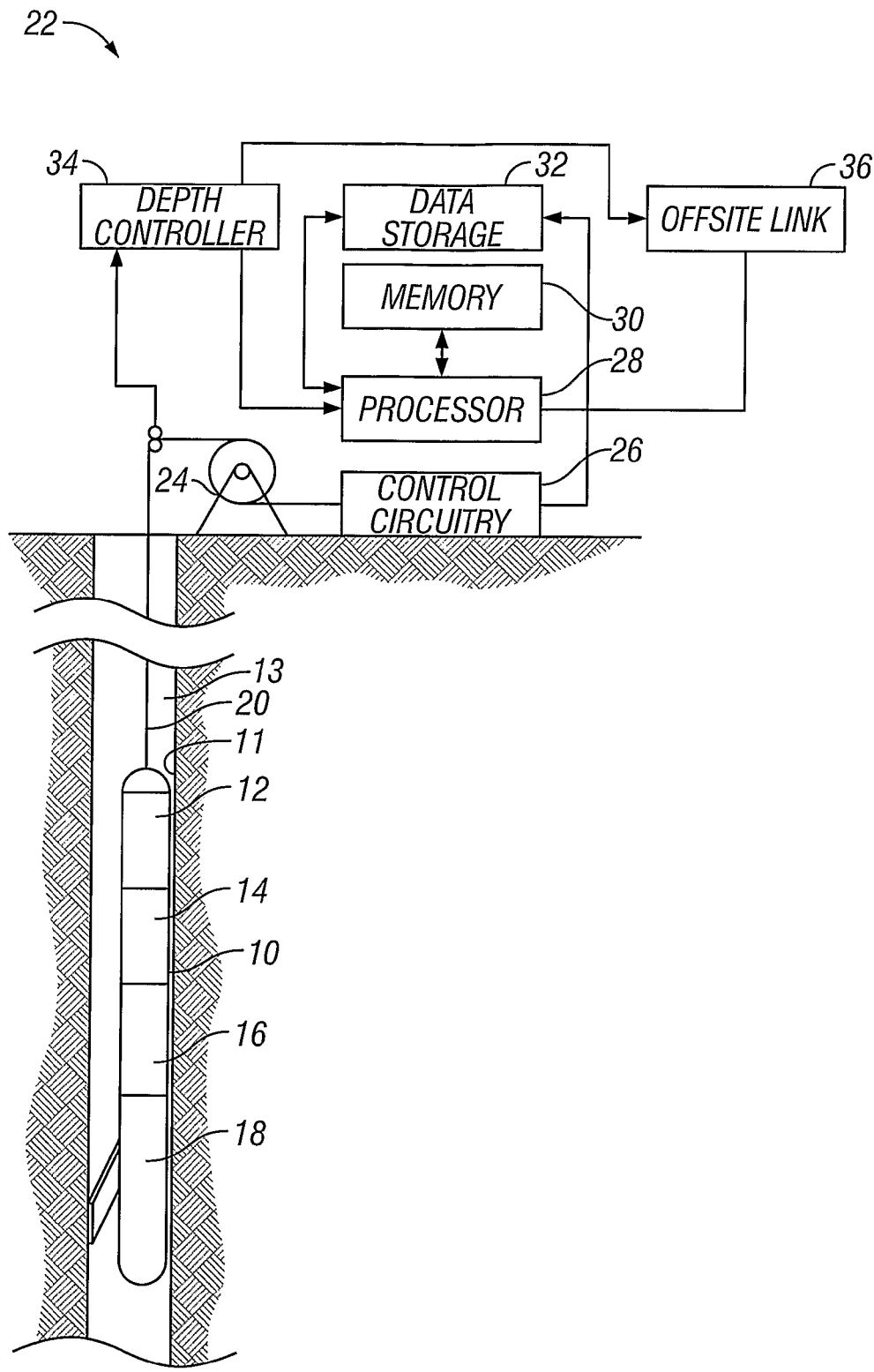
FIG. 1 shows an exemplary apparatus suitable for performing the method of the present disclosure conveyed within a wellbore.

A typical configuration of the logging system is shown in FIG. 1. This is a modification of an arrangement from U.S. Pat. No. 4,953,399 to Fertl et al., having the same assignee as the present invention, the contents of which are incorporated herein by reference. Shown in FIG. 1 is a suite of logging instruments 10, disposed within a borehole 11 penetrating an earth formation 13, illustrated in vertical section, and coupled to equipment at the earth's surface, in accordance with various illustrative embodiments of the method and apparatus of the present invention. Logging instrument suite 10 may include a resistivity device 12, a natural gamma ray device 14, and/or two porosity-determining devices, such as a neutron device 16 and/or a density device 18. Collectively, these devices and others used in the borehole for logging operations are referred to as formation evaluation sensors. The resistivity device 12 may be one of a number of different types of instruments known to the art for measuring the electrical resistivity of formations surrounding a borehole so long as such device has a relatively deep depth of investigation. For example, a HDIL (High Definition Induction Logging) device such as that described in U.S. Pat. No. 5,452,761 to Beard et al., having the same assignee as the present invention, the contents of which are fully incorporated herein by reference, may be used. The natural gamma ray device 14 may be of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. The neutron device 16 may be one of several types known to the art for using the response characteristics of the formation to neutron radiation to determine formation porosity. Such a device is essentially responsive to the neutron-moderating properties of the formation. The density device 18 may be a conventional gamma-gamma density instrument such as that described in U.S. Pat. No. 3,321,625 to Wahl, used to determine the bulk density of the formation. A downhole processor 29 may be provided at a suitable location as part of the instrument suite.

The logging instrument suite 10 is conveyed within borehole 11 by a cable 20 containing electrical conductors (not illustrated) for communicating electrical signals between the logging instrument suite 10 and the surface electronics, indicated generally at 22, located at the earth's surface. The logging devices 12, 14, 16, and/or 18 within the logging instrument suite 10 are cooperatively coupled such that electrical signals may be communicated between each of the logging devices 12, 14, 16, and/or 18 and the surface electronics 22. The cable 20 is attached to a drum 24 at the earth's surface in a manner familiar to the art. The logging instrument suite 10 is caused to traverse the borehole 11 by spooling the cable 20 on to or off of the drum 24, also in a manner familiar to the art.

The surface electronics 22 may include such electronic circuitry as is necessary to operate the logging devices 12, 14, 16, and/or 18 within the logging instrument suite 10 and to process the data therefrom. Some of the processing may be done downhole. In particular, the processing needed for making decisions on speeding up (discussed below) or slowing down the logging speed is preferably done downhole. If such processing is done downhole, then telemetry of instructions to speed up or slow down the logging could be carried out substantially in real time. This avoids potential delays that could occur if large quantities of data were to be telemetered uphole for the processing needed to make the decisions to alter the logging speed. It should be noted that with sufficiently fast communication rates, it makes no difference where the decision-making is carried out. However, with present data rates available on wirelines, the decision-making is preferably done downhole.

Control circuitry 26 contains such power supplies as are required for operation of the chosen embodiments of logging devices 12, 14, 16, and/or 18 within the logging instrument suite 10 and further contains such electronic circuitry as is necessary to process and normalize the signals from such logging devices 12, 14, 16, and/or 18 in a conventional manner to yield generally continuous records, or logs, of data pertaining to the formations surrounding the borehole 11. These logs may then be electronically stored in a data storage 32 prior to further processing. A surface processor 28 may process the measurements made by the formation evaluation sensor(s) 12, 14, 16, and/or 18. This processing could also be done by the downhole processor 29.

The surface electronics 22 may also include such equipment as will facilitate machine implementation of various illustrative embodiments of the method of the present invention. The surface processor 28 may be of various forms, but preferably is an appropriate digital computer programmed to process data from the logging devices 12, 14, 16, and/or 18. A memory unit 30 and the data storage unit 32 are each of a type to interface cooperatively with the surface processor 28 and/or the control circuitry 26. A depth controller 34 determines the longitudinal movement of the logging instrument suite 10 within the borehole 11 and communicates a signal representative of such movement to the surface processor 28. The logging speed is altered in accordance with speedup or slowdown signals that may be communicated from the downhole processor 29, and/or provided by the surface processor 28, as discussed below. This is done by altering the rotation speed of the drum 24. Offsite communication may be provided, for example, by a satellite link, by a telemetry unit 36.

Figure 2:
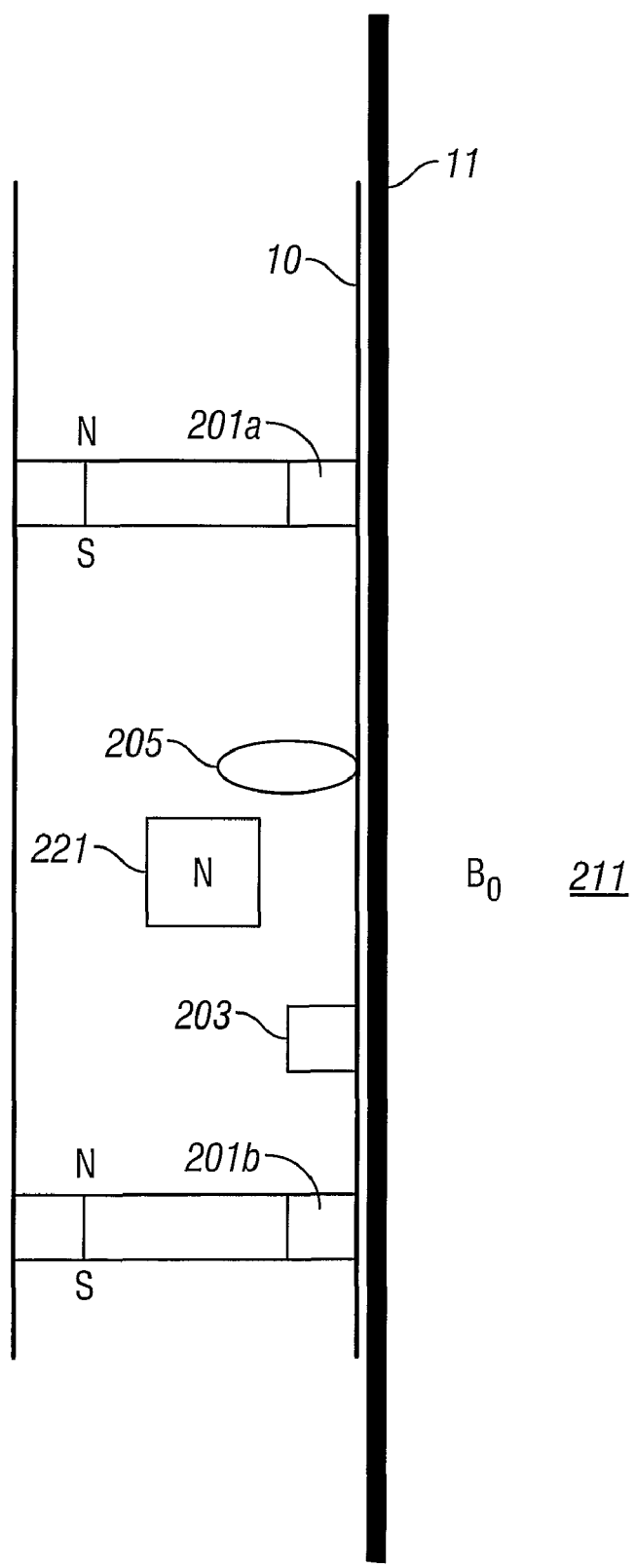
FIG. 2 schematically illustrates a magnet configuration of a resistivity apparatus suitable for use with the present disclosure.

Turning now to FIG. 2, an acoustic transmitter 203 is positioned at the borehole wall 11 in contact with the formation. 211. The formation is porous and saturated with an electrolyte. At the borehole wall 11, a multicomponent motion sensor (geophone or accelerometer) 205 is positioned. In one embodiment of the disclosure, the magnetic field sensor may include a loop antenna. The acoustic transmitter 203 is activated to produce in the porous medium two acoustic waves. In one embodiment of the disclosure, the generated acoustic waves propagate primarily along the axial direction of the borehole. This direction may be referred to as the x-direction. The apparatus also includes a first magnet arrangement such as denoted by 201a, 201b that produces a constant magnetic field in the formation with a radial direction. A second magnet, denoted by 221 provides a time-varying magnetic field that is approximately tangential to the borehole. The analysis that is made below uses a planar approximation for the interface. The coordinate system used is that the x-axis is in the radial direction (perpendicular to the interface between the fluid and the formation), and the y- and z-axes are along the borehole wall. For the purposes of the disclosure, it is sufficient that the magnetic field have a component along the direction of propagation of the acoustic wave in the formation. The magnets 201a, 201b, 221 are electromagnets driven by a variable frequency source (not shown).

The acoustic transmitter is positioned in the plane x=0. Motion of the transducer in the yz plane will produce a shear wave in the formation. In the absence of the magnetic field, this can be decomposed into two independent shear waves propagating into the formation, one with polarization along the y-axis and one with polarization along the z-axis. In the presence of the static magnetic field and electrolytes in the formation fluid, magnetoacoustic vibrations result in the formation resulting in two different electroacoustic waves. In one embodiment of the disclosure, the acoustic transmitter includes a wide-band transducer. The frequency of excitation of the transducer is changed, and the strength of the magnetic field in the magnetic field sensor as a function of frequency is recorded. As discussed below, there is a resonance frequency at which the magnetic field exhibits a maximum amplitude. This resonance frequency is related to the formation properties.

The theory behind the electroacoustic resonance method for measuring water-oil ratio in a porous medium in the presence of electrolyte is the electrodynamic theory combined with the non-linear theory of elastic deformations of fluid-saturated media. Such a theory considers the following conservation laws as the initial set of differential equations:

Conservation of Mass:

$$\frac{\partial \rho}{\partial t} + \nabla \cdot (\rho_s u + \rho_l v) = 0, \tag{1}$$

conservation of entropy, energy and momentum:

$$\frac{\partial S}{\partial t} + \nabla \cdot \left[\frac{S}{\rho}(\rho_s u + \rho_l v)\right] = \frac{R}{T}, \tag{2}$$

$$\frac{\partial E}{\partial T} + \nabla \cdot Q = 0, \tag{3}$$

-continued $$\frac{\partial}{\partial t}\left[(\rho_s u + \rho_l v) + \frac{E \times H}{4\pi c_e}\right]_i + \partial_k \Pi_{ik} = 0, \quad (4)$$

and the first law of Thermodynamics:

$$dE_0 = TdS + \mu d\rho + [u - v, dj_0] + \frac{h_{ik}}{2} dg_{ik}. \quad (5)$$

The evolution of the tensor of the deformation of the matrix of the earth formation is given by:

$$\frac{\partial g_{ik}}{\partial t} + g_{ik}\partial_i u_j + g_{ij}\partial_k u_j + u_j \partial_j g_{ik} = 0, \quad (6)$$

the motion of the electrolyte in the porous matrix is given by:

$$\frac{\partial v}{\partial t} + (v, \nabla)v = -\nabla \mu - \frac{S}{\rho}\nabla T + f + f^\partial. \quad (7)$$

The full energy is given by $$E = E_0 + vj_0 + \frac{\rho v^2}{2} + \frac{E^2 + H^2}{8\pi}. \quad (8)$$

In eqns. (1)-(8), the following notation is used: $\rho, \rho_1, \rho_s$ are density of the porous saturated medium, partial density of the electrolyte in pores, partial density of the matrix; S, E, Eo are entropy, energy, and internal energy per unit of volume of the medium; u, v are velocities of the matrix and of the electrolyte contained in it; E, H are the electric and magnetic fields; $\mu$, T are the chemical potential and temperature from the first principle of thermodynamics; $j_0 = \rho_s(u-v)$ is the invariant component of the momentum.

Full energy expression is obtained from the energy equation used in the hydrodynamic theory, extended to a two-velocity continuous medium. The electromagnetic theory is included up to a square-law accuracy for v/c. The motion eqn (7) for the liquid component contains the motion force on the right-hand side. This motion force is linear with respect to gradients of thermodynamic variables whose equilibrium values are constant within the scale of the system. The physical essence of this theory is determined by dependence of flows from thermodynamic variables and can be uniquely defined by the following physical principles of general nature: invariance of these equations in regard to Galileo transformation, Minkovsky transformation for electromagnetic fields, conservation laws, and the second principle of thermodynamics for non-equilibrium systems. Based on these principles, dependences of flows and forces upon thermodynamic degrees of freedom can be determined.

The stress tensor follows the relation:

$$h_{ik} = -\rho^2 \frac{\partial(E_0/\rho)}{\partial \rho} \delta_{ik} - 2\rho g_{im} \frac{\partial(E_0/\rho)}{\partial g_{mk}}. \quad (9)$$

The density tensor of the momentum flow satisfies $$\Pi_{ik} = \rho_s u_i u_k + \rho_l v_i v_k + h_{ij} g_{jk} - \frac{B_i B_k}{4\pi} - \frac{E_i E_k}{4\pi} + \frac{E^2 + H^2}{8\pi} \delta_{ik}, \quad (10)$$

where c is the electrodynamic constant (speed of light). Pressure is determined by the thermodynamic equation:

$$p = -E_0 + TS + \mu\rho + (u-v, j_0) \quad (11),$$

for energy flow:

$$Q = \left(\mu + \frac{v^2}{2}\right)j + \frac{TS}{\rho}j + u(u, j_0) + \frac{c}{4\pi}E \times B + u_i h_{km} g_{mi}, \quad (12)$$

dissipative function:

$$R = f^\partial(\rho u - j) + i_0\left(E + \frac{j^e}{c\chi} \times B\right), \quad (13)$$

volume density of reversible forces:

$$f = \frac{\chi_l}{\rho_l}\left(E + \frac{j^e}{c\chi} \times B\right), \quad (14)$$

includes volumetric densities of free charges $\chi_s$, $\chi_l$, $\chi = \chi_l$ which correspond to subsystems in which the following equations work: $\chi_s = \sigma_s \sigma_{-1} \chi$, $\chi_l = \sigma_l \sigma^{-1} \chi$. Here, $\sigma_l$, $\sigma_s$, $\sigma = \sigma_s + \sigma_l$ are densities associated with the matching subsystems.

The dissipative function allows linking the dissipative force $f^\partial$ and the invariant component of the full current density $j^e$ $$i_0 = j^e - \chi_s u - \chi_l v \quad (15)$$

to thermodynamic forces by means of introducing kinetic phenomenological coefficients
□, □, and □

$$f^\partial = \chi(\rho u - j) + \alpha_{12}\left(E + \frac{j^e}{c^e \chi} \times B\right), \quad (16).$$

$$i_0 = \alpha_{21}(\rho u - j) + \sigma\left(E + \frac{j^e}{c^e \chi} \times B\right),$$

$$\alpha_{12}(B) = \alpha_{21}(-B) = \alpha.$$

These equations are closed by Maxwell's equations (with no polarization effect considered):

$$\nabla \times E = -\frac{1}{c}\frac{\partial B}{\partial t}, \nabla \times B = +\frac{1}{c}\frac{\partial E}{\partial t} + \frac{4\pi}{c}j^e, \quad (17)$$

$$\nabla \cdot E = 4\pi\chi, \nabla \cdot B = 0.$$

These equations do not consider effects related to transfers of contaminating compounds concentrations. Also, kinetic effects of scalar and tensor nature are not included. In irreversible vector flows thermoconductivity effects are neglected. The state equation can be obtained both arbitrarily and in Hook approximation by means of expansion of internal energy according to thermodynamic degrees of freedom up to cubic terms of the series. These equations describe electrolyte filtration in a porous matrix undergoing arbitrary elastic deformations. These equations describe the entire range of acoustic, electroacoustic, and magnetoacoustic waves allowed in the system.

In linear approximation for velocities of deformation and fluid motion and in quasistationary approximation of the electromagnetic field, the set of equations can be reduced to a set of three equations, with linear accuracy:

$$\ddot{u} - c_l^2 \Delta u - a_1 \nabla \nabla \cdot u + a_2 \nabla \nabla \cdot v - \tag{18}$$

$$\frac{\sigma_l}{4\pi\sigma\rho_{0,s}} \nabla \times \dot{B} \times B^{(0)} + \frac{\rho_{0,l}^2}{\rho_{0,s}} \overline{\chi}(\dot{u} - \dot{v}) + \frac{\alpha c \rho_{0,l}}{4\pi\sigma\rho_{0,s}} \nabla \times \dot{B} = 0,$$

$$\ddot{v} - a_4 \nabla \nabla \cdot v + a_3 \nabla \nabla \cdot u - \frac{\sigma_l}{4\pi\sigma\rho_{0,l}} \nabla \times \dot{B} \times B^{(0)} -$$

$$\rho_{0,l} \overline{\chi}(\dot{u} - \dot{v}) - \frac{\alpha c}{4\pi\sigma} \nabla \times \dot{B} = 0,$$

$$\frac{\partial B}{\partial t} = \nabla \times \left[ -\frac{c^2}{4\pi\sigma} \nabla \times B + \frac{\alpha c \rho_l (u - v)}{\sigma} + \frac{\sigma_s}{\sigma} u \times B^{(0)} + \frac{\sigma_l}{\sigma} v \times B^{(0)} \right].$$

Here, $B^{(0)}$ is the external magnetic field, $\alpha_i$ are coefficients related to elastic modules, $\square_{0,l} \square_{0,s}$ are partial densities of the non-excited medium, $\overline{\chi}=\chi-\alpha^2/\sigma$, $\chi=\eta/(\rho\rho_{0,l}k)$, k—permeability.

1D analysis in the absence of the external magnetic field of the electroacoustic theory is related to propagation of electroacoustic waves along the x-axis $$\ddot{u}_z - c_l^2 \frac{\partial^2 u_z}{\partial x^2} + \frac{\rho_{0,l}^2}{\rho_{0,s}} \tilde{\chi}(\dot{u}_z - \dot{v}_z) + \frac{\alpha c \rho_{0,l}}{4\pi\sigma\rho_{0,s}} \frac{\partial \dot{B}_y}{\partial x} = 0, \tag{19}$$

$$\ddot{u}_y - c_l^2 \frac{\partial^2 u_y}{\partial x^2} + \frac{\rho_{0,l}^2}{\rho_{0,s}} \tilde{\chi}(\dot{u}_y - \dot{v}_y) + \frac{\alpha c \rho_{0,l}}{4\pi\sigma\rho_{0,s}} \frac{\partial \dot{B}_z}{\partial x} = 0,$$

$$\ddot{v}_z - \rho_{0,l} \tilde{\chi}(\dot{u}_z - \dot{v}_z) + \frac{ac}{4\pi\sigma} \frac{\partial \dot{B}_y}{\partial x} = 0,$$

$$\ddot{v}_y - \rho_{0,l} \tilde{\chi}(\dot{u}_y - \dot{v}_y) + \frac{ac}{4\pi\sigma} \frac{\partial \dot{B}_z}{\partial x} = 0,$$

$$\frac{\partial B_y}{\partial y} = \frac{\partial}{\partial x} \left[ \frac{c^2}{4\pi\sigma} \frac{\partial B_y}{\partial x} - \frac{ac\rho_l}{\sigma}(u_z - v_z) \right],$$

$$\frac{\partial B_z}{\partial y} = \frac{\partial}{\partial x} \left[ \frac{c^2}{4\pi\sigma} \frac{\partial B_z}{\partial x} - \frac{ac\rho_l}{\sigma}(u_y - v_y) \right].$$

It appears clear that, in the absence of the external magnetic field, two groups of independently propagating waves are observed. In the presence of the magnetic field, interaction between the two independent modes creates a polarized wave described by this set of equations:

$$\ddot{u}_z - c_l^2 \frac{\partial^2 u_z}{\partial x^2} - \frac{\sigma_s B_x^{(0)}}{4\pi\sigma\rho_{0,s}} \frac{\partial \dot{B}_z}{\partial x} + \tag{20}$$

$$\frac{\rho_{0,l}^2}{\rho_{0,s}} \left[ \chi - \frac{\alpha^2}{\sigma} \right](\dot{u}_z - \dot{v}_z) + \frac{\alpha c \rho_{0,l}}{4\pi\sigma\rho_{0,s}} \frac{\partial \dot{B}_y}{\partial x} = 0$$

$$\ddot{v}_z - \frac{\sigma_l B^{(0)}}{4\pi\sigma\rho_{0,l}} \frac{\partial \dot{B}_z}{\partial x} - \rho_{0,l} \tilde{\chi}(\dot{u}_z - \dot{v}_z) - \frac{ac}{4\pi\sigma} \frac{\partial \dot{B}_y}{\partial x} = 0$$

$$\ddot{u}_y - c_l^2 \frac{\partial^2 u_y}{\partial x^2} - \frac{\sigma_s B_x^{(0)}}{4\pi\sigma\rho_{0,s}} \frac{\partial \dot{B}_y}{\partial x} +$$

$$\frac{\rho_{0,l}^2}{\rho_{0,s}} \tilde{\chi}(\dot{u}_y - \dot{v}_y) - \frac{\alpha c \rho_{0,l}}{4\pi\sigma\rho_{0,s}} \frac{\partial \dot{B}_z}{\partial x} = 0$$

$$\ddot{v}_y - \frac{\sigma_l B^{(0)}}{4\pi\sigma\rho_{0,l}} \frac{\partial \dot{B}_y}{\partial x} - \rho_{0,l} \tilde{\chi}(\dot{u}_y - \dot{v}_y) + \frac{ac}{4\pi\sigma} \frac{\partial \dot{B}_z}{\partial x} = 0$$

$$\frac{\partial B_y}{\partial t} = \frac{\partial}{\partial x} \left[ \frac{c^2}{4\pi\sigma} \frac{\partial B_y}{\partial x} - \frac{ac\rho_l}{\sigma}(u_z - v_z) + \frac{\sigma_s}{\sigma} u_y B_x^{(0)} + \frac{\sigma_l}{\sigma} v_y B_x^{(0)} \right]$$

$$\frac{\partial B_z}{\partial t} = \frac{\partial}{\partial x} \left[ \frac{c^2}{4\pi\sigma} \frac{\partial B_z}{\partial x} - \frac{ac\rho_l}{\sigma}(u_y - v_y) + \frac{\sigma_s}{\sigma} u_z B_x^{(0)} + \frac{\sigma_l}{\sigma} v_z B_x^{(0)} \right].$$

For periodic excitation, $$(u_z, v_z, B_y; u_y, v_y, B_y) = (u_z, v_z, B_y; u_y, v_y, B_y) e^{\frac{i\omega x}{\xi}} e^{-i\omega t}.$$

This then gives $$B_y = 4\pi \frac{\rho_{0,l}}{\rho_{0,s}} \xi \frac{\Delta}{\alpha^2 c^2 / \sigma^2 - \tilde{\chi} B_0^2 / \omega^2} \left( \frac{ac}{\sigma} u_z - \frac{i\tilde{\chi} B_0}{\omega} u_y \right), \tag{21}$$

$$B_z = -4\pi \frac{\rho_{0,l}}{\rho_{0,s}} \xi \frac{\Delta}{\alpha^2 c^2 / \sigma^2 - \tilde{\chi} B_0^2 / \omega^2} \left( \frac{ac}{\sigma} u_y + \frac{i\tilde{\chi} B_0}{\omega} u_z \right), \tag{22}$$

where $$\Delta = \left(1 - \frac{c_l^2}{\xi^2}\right) \left(1 + \frac{i\rho_{0,l} \tilde{\chi}}{\omega}\right) + \frac{i\rho_{0,l}^2 \tilde{\chi}}{\rho_{0,s} \omega}, \tilde{\chi} = \chi - \frac{\alpha^2}{\sigma}. \tag{23}$$

The velocity $\xi$ of these dispersive waves satisfies the relation:

$$\frac{\alpha^2 c^2 \rho_{0,l}^2}{\rho_{0,s} \sigma^2} - \left( \frac{\alpha^2 c^2 \rho_{0,l}}{\sigma^2} + \frac{B_0^2}{\rho_{0,l}} \right) \left( \frac{c_l^2}{\xi^2} - 1 \right) + \frac{i\rho_{0,l} \tilde{\chi} B_0^2}{\rho_{0,s} \omega} = \tag{24}$$

$$4\pi \xi^2 \Delta \left(1 + \frac{ic^2 \omega}{4\pi\sigma\xi^2}\right).$$

In these relations, $c_t$ is the velocity of a shear wave in the medium in the absence of excitation. The matrix conductivity is assumed to be zero.

Eqns. (21) and (22) lead to the conclusion that resonance occurs when the acoustic excitation is at a frequency $$\omega_0 = \frac{B_0}{c} \frac{\tilde{\chi}\sigma}{\alpha}. \tag{25}$$

Thus, the resonance frequency depends not only on the external magnetic field, but also on the three kinetic phenomena: conductivity $\sigma$, effective magnetic permeability and the electrokinetics constant $\alpha$. For an exemplary field $B_0$ of $10^3$ Gauss, $\sigma=10^9$ 1/S, $\alpha=10^6$ cm$^{3/2}$/(g.s) the resonance frequency is approximately 60 Hz. This is well within the capability of an acoustic transducer in a borehole.

The source of the electroacoustic signal, which is the time-dependent magnetic field orthogonal to wave propagation direction, is placed on the borehole wall. On the same wall we also have a receiver measuring the velocities of surface deformation in two mutually orthogonal directions. In this case the receiver will register (we consider plane geometry) these amplitudes:

$$u_y = i\frac{\varepsilon \alpha c_e}{4\pi \sigma \omega} \frac{\beta_1 \beta_2}{1+i(1+\varepsilon)\overline{\omega}/\omega} \frac{\beta_2 e^{-\beta_1 x} - \beta_1 e^{-\beta_2 x}}{\beta_1^2 - \beta_2^2} B_{0z}(\omega), \quad (26)$$

$$u_z = \frac{\beta_1 \beta_2}{\beta_2^2 - \beta_1^2} \frac{\varepsilon B_0 \overline{\chi}}{4\pi \omega^2} \frac{(\beta_2 e^{-\beta_1 x} - \beta_1 e^{-\beta_2 x})}{1+i(1+\varepsilon)\overline{\omega}/\omega} B_{0z}(\omega).$$

At resonance frequency, on the surface (x=0) these amplitudes are thus related:

$$u_z = i\frac{\omega_0}{\omega} u_y$$

The sensor of the velocities of matrix deformation at the boundary between the two media measures two components of the vector u=($u_y$, $u_z$) simultaneously. The frequency of the magnetic field to achieve equality of $|u_x|$ and $|u_y|$. This is defined as a resonance condition.

Under resonance condition, $$\omega_0 = \frac{B_0}{c_e} \frac{\overline{\chi}\sigma}{\alpha}. \quad (27)$$

Hence $$\frac{\alpha}{\overline{\chi}\sigma} = \frac{B_0}{c_e \omega_0}. \quad (28)$$

The quantity on the right hand side of eqn. (28) is a known quantity since $B_0$ and $\Box_0$ are measured quantities.

Along with a measurement of the resonance frequency and the magnetic field, the deformation velocities are also measured at the resonance frequency.

$$u_0 = \frac{\varepsilon \overline{\chi} B_0}{4\pi \omega_0^2 [1+i(1+\varepsilon)\overline{\omega}/\omega_0]} \frac{\beta_1 \beta_2}{\beta_1 + \beta_2} B_{0z}(\omega_0). \quad (29)$$

The dispersion relation is $$\beta^4 + \left(\frac{\varphi_1}{c_t^2} + \frac{i\omega}{\alpha_1} - \frac{\theta}{c_t^2 \alpha_1}\right)\beta^2 + \frac{i\omega \varphi_1}{c_t^2 \alpha_1} = 0. \quad (30)$$

At the resonance frequency, $\Box$=0, which gives the two roots of eqn (30) as:

$$\beta_2^2 = -\frac{\varphi_1}{c_t^2} = -\frac{\omega_0^2}{c_t^2}\left(1+\varepsilon\frac{i\overline{\omega}/\omega_0}{1+i\overline{\omega}/\omega_0}\right) \quad (31)$$

$$\beta_1^2 = -\frac{i\omega_0}{\alpha_1} = \frac{4\pi\sigma\omega_0^2/c_e^2}{i - \frac{1}{1+i\overline{\omega}/\omega_0}\left(\frac{\hat{\omega}}{\omega_0} + \frac{B_0^2}{\rho_{0,l}c_e^2}\frac{\sigma}{\omega_0}\right)}.$$

When the following conditions are satisfied:

$$\frac{\overline{\omega}}{\omega_0} > 1, \quad \frac{\hat{\omega}}{\omega_0} < 1, \quad \frac{B_0^2}{\rho_{0,l} c_e^2} < \frac{\omega_0}{\sigma}, \quad (32)$$

we get the relations:

$$\frac{\alpha}{\overline{\chi}} = \sigma\frac{B_0}{c_e \omega_0} = const; \quad (33)$$

$$\sqrt{\sigma} \approx \frac{\sqrt{4\pi\omega_0}\,\rho_0 c_e |u_0|}{B_0 B_{0z}(\omega_0)} = const,$$

$$\alpha/\chi \approx \frac{\varepsilon\zeta\rho_0}{4\pi\cdot\eta},$$

where $\varepsilon$ is the permittivity, $\eta$ is the dynamic viscosity, $\zeta$- is $\zeta$-potential. The first of the two equations is the same as eqn. (25). The second equation gives the conductivity $\Box$ under the resonance condition since all the quantities are known. The third equation gives the relationship $\alpha/\chi$ with $\zeta$-potential. It is also possible to measure $\overline{\chi}=\chi-\alpha^2/\sigma$ (therefore permeability—k) at any frequency using the formula above for $\alpha$=0.

In the case ($\alpha$=0) equations (20) have only one the group of equations:

$$\ddot{u}_z - c_t^2 \frac{\partial^2 u_z}{\partial x^2} + \varepsilon\overline{\omega}(\dot{u}_z - \dot{v}_z) = 0, \quad (34)$$

$$\dot{v}_z - \frac{B_0}{4\pi\rho_{0,l}}\frac{\partial B_z}{\partial x} - \overline{\omega}(\dot{u}_z - \dot{v}_z) = 0,$$

$$\frac{\partial B_z}{\partial t} = \frac{c_e^2}{4\pi\sigma}\frac{\partial^2 B_z}{\partial x^2} + B_0\frac{\partial v_z}{\partial x},$$

which describe propagation of independent elastic S-waves excited by the quasistationary magnetic field. In these formulae the characteristic frequency $\overline{\omega}=\rho_{0,l}\chi$ is introduced, as well as the ratio $\varepsilon=\rho_{0,l}/\rho_{0,s}$. Let us discuss the group of waves and basic features of plane harmonic waves:

$$(u_z, v_z, B_z) \Rightarrow (u_z, v_z, B_z)\cdot\exp(-i\omega t),$$

whose dependence on coordinates is described by this set of differential equations:

$$\omega^2 u_z + c_t^2 \frac{\partial^2 u_z}{\partial x^2} + i\varepsilon\overline{\omega}\omega(u_z - v_z) = 0, \quad (35)$$

$$\omega v_z - i\frac{B_0}{4\pi\rho_{0,l}}\frac{\partial B_z}{\partial x} - i\overline{\omega}(u_z - v_z) = 0,$$

$$\frac{c_e^2}{4\pi\sigma}\frac{\partial^2 B_z}{\partial x^2} + B_0\frac{\partial v_z}{\partial x} + i\omega B_z = 0.$$

From the second equation of the set we can find the fluid velocity:

$$v_z = \frac{i}{\omega + i\overline{\omega}}\frac{B_0}{4\pi\rho_{0,l}}\frac{\partial B_z}{\partial x} + \frac{i\overline{\omega}}{\omega + i\overline{\omega}}u_z, \quad (36)$$

and then write out set (35) as a set of these two equations:

$$\frac{\partial^2 u_z}{\partial x^2} + \frac{\omega^2}{c_t^2}\left(1 + \frac{i\varepsilon\bar{\omega}}{\omega + i\bar{\omega}}\right)u_z + \frac{\varepsilon\omega\bar{\omega}}{(\omega + i\bar{\omega})}\frac{B_0^2}{4\pi\rho_{0,l}c_t^2}\frac{\partial B}{\partial x} = 0, \quad (37)$$

$$\frac{i\bar{\omega}}{(\omega + i\bar{\omega})}\frac{\partial u_z}{\partial x} + D\frac{\partial^2 B}{\partial x^2} + i\omega B = 0.$$

In formula (37) a measureless magnetic field is defined:

$$B_z = B_o B \quad (38)$$

as well as this parameter:

$$D = \frac{c_e^2}{4\pi\sigma} + \frac{iB_0^2}{4\pi\rho_{0,l}(\omega + i\bar{\omega})}. \quad (39)$$

The latter equation serves as an equation which determines the velocity of the matrix deformation through the measureless magnetic field:

$$\frac{\partial u_z}{\partial x} = -\left(1 - i\frac{\omega}{\bar{\omega}}\right)D\hat{L}B, \quad (40)$$

which, in its turn, is found from a linear differential equation of the fourth order:

$$\hat{L}\left[\frac{\partial^2 B}{\partial x^2} + \frac{\omega^2}{c_t^2}\left(1 + \frac{\varepsilon i\bar{\omega}}{\omega + i\bar{\omega}}\right)B\right] = \frac{B_0^2}{4\pi\rho_{0,1}c_t^2}\frac{i\varepsilon\bar{\omega}^2\omega}{D(\omega + i\bar{\omega})^2}\frac{\partial^2 B}{\partial x^2}. \quad (41)$$

A linear differential operator is introduced in these equations:

$$\hat{L} = \frac{\partial^2}{\partial x^2} + \frac{i\omega}{D}. \quad (42)$$

As we already have a solution to equation (41) for the magnetic field, deformation velocity of the porous matrix is found by integrating (40). For a boundless half-space x>0 exponentially attenuating solutions like the one below may be of interest:

$$B \sim e^{-\beta x}. \quad (43)$$

Substituting (43) in equation (41), we arrive at a bi-quadratic algebraic equation which determines possible values of the exponential factor.
We would like to find the roots of this equation:

$$\left[\beta^2 + \frac{\omega^2}{c_t^2}\left(1 + \frac{\varepsilon i\bar{\omega}}{\omega + i\bar{\omega}}\right)\right]\left[\beta^2 + i\frac{\omega}{D}\right] = \frac{B_0^2}{4\pi\rho_{0,1}c_t^2}\frac{i\varepsilon\bar{\omega}^2\omega}{D(\omega + i\bar{\omega})^2}\beta^2, \quad (44)$$

which contain positive real parts:

$$\beta = \{\beta_1, \beta_2\}, \text{Re}\beta_1 > 0, \text{Re}\beta_2 > 0. \quad (45)$$

The latter form of the roots is convenient for calculating them at small values of the external longitudinal magnetic field $B_0$. Bi-quadratic equation (44) has two roots with positive real parts:

$$B = N_{1z}e^{-\beta_1 x} + N_{2z}e^{-\beta_2 x}. \quad (46)$$

Equation (40) enables us to write $$u_z = \left(1 - i\frac{\omega}{\bar{\omega}}\right)\frac{M_1}{\beta_1}N_{1z}e^{-\beta_1 x} + \left(1 - i\frac{\omega}{\bar{\omega}}\right)\frac{M_2}{\beta_2}N_{2z}e^{-\beta_2 x}, \quad (47)$$

$$M_1 = D\beta_1^2 + i\omega,$$

$$M_2 = D\beta_2^2 + i\omega.$$

Constants $N_{1z}$, $N_{2z}$ are found from boundary conditions:

$$N_{1z} + N_{2z} = B_z(\omega)(x = 0) = \frac{B_{z0}(\omega)}{B_0}, \quad (48)$$

$$-\left(1 - i\frac{\omega}{\bar{\omega}}\right)M_1 N_{1z} - \left(1 - i\frac{\omega}{\bar{\omega}}\right)M_2 N_{2z} = 0.$$

The first condition reflects the presence of the external time-dependent magnetic field on the surface of the boundary x=0, the second condition reflects the absence of tangential forces applied to the surface. Simple calculations lead to:

$$B_z = \frac{B_{z0}(\omega)}{D(\beta_1^2 - \beta_2^2)}(M_1 e^{-\beta_2 x} - M_2 e^{-\beta_1 x}), \quad (49)$$

$$u_z = \frac{B_{z0}(\omega)}{DB_0}\left(1 - i\frac{\omega}{\bar{\omega}}\right)\frac{M_1 M_2}{\beta_2^2 - \beta_1^2}\left(\frac{e^{-\beta_1 x}}{\beta_1} - \frac{e^{-\beta_2 x}}{\beta_2}\right).$$

The first solution determines how the external alternating magnetic field permeates through the porous medium, the second solution determines the character of acoustic waves generated by it in the presence of the longitudinal stationary magnetic field (longitudinal meaning aligned with the direction of wave propagation). First of all, let us note that according to formula (11), two S-waves are generated in such a situation. The superposition of these waves at the boundary x=0 gives the deformation velocity of the matrix:

$$u_z(x = 0) = \frac{B_{z0}(\omega)}{D(\chi)B_0}\left(1 - i\frac{\omega}{\bar{\omega}}\right)\frac{M_1(\chi)M_2(\chi)}{\beta_2^2(\chi) - \beta_1^2(\chi)}\left(\frac{1}{\beta_1(\chi)} - \frac{1}{\beta_2(\chi)}\right). \quad (50)$$

Italics here show the exact solution and the equation which determines roots $\beta_1$, $\beta_2$.

Figure 3:
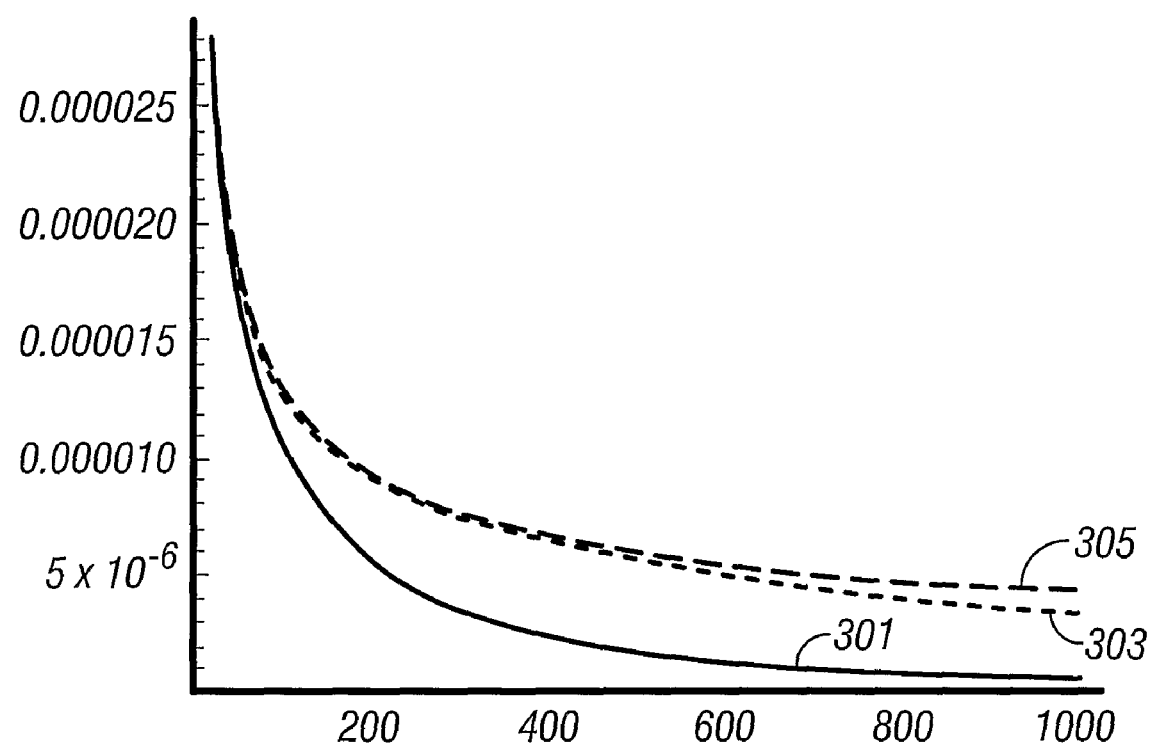
FIG. 3 shows the dependence of $|u_z|/|B_{oz}(\omega)|$ on frequency for different values of the friction coefficient.

Let us consider this frequency dependence of $|u_z|/|B_{oz}(\omega)|$ for various values of the friction coefficient $\chi$ shown in FIG. 3. The curves 301, 303 and 305 correspond to values of $\chi$ of $10^4$ cm$^3$/(g.s), $10^5$ cm$^3$/(g.s) and $10^6$ cm$^3$/(g.s) respectively. From this, it is clear that if we have adequate frequency dependence, we can estimate permeability of the system, regardless of what we know about conductivity. In this case, as it is seen from the graph, the resolution is higher in the higher-frequency domain. Note that we need to know conductivity here if we want to use our theoretical formulae. Actually, we would be measuring the friction coefficient (permeability).

In one embodiment of the disclosure, porosity of the formation may be estimated. Consider the excitation of the system by stresses $$\left(\frac{\partial u_z}{\partial x}\right)$$

along the surface of the boundary as given by the formula:

$$u_z = \frac{\beta_1 \beta_2}{\beta_1^2 - \beta_2^2} \frac{c_t^2}{\omega^2} \quad (51)$$

$$\frac{1 + i\overline{\omega}/\omega_0}{1 + i(1+\varepsilon)\overline{\omega}/\omega_0} \left[\left(\beta_2 + \frac{\varphi_1}{c_t^2 \beta_2}\right) e^{-\beta_2 x} - \left(\beta_1 + \frac{\varphi_1}{c_t^2 \beta_1}\right) e^{-\beta_1 x}\right] \frac{\partial u_z}{\partial x}.$$

On the surface, at resonant frequency, this gives:

$$|u_z|_{x=0} \approx -\frac{1}{\beta_2} \left|\frac{\partial u_z}{\partial x}\right|_{x=0}, \quad (52)$$

$$|\beta_2| \approx \frac{\omega_0}{c_t^2} \sqrt{\frac{\rho_0}{\rho_{0,s}}}.$$

Consequently, we get a formula which enables us to determine porosity if we have measured the amplitude of the surface oscillations velocity and its given spatial derivative (the tangential force of the surface impact is fixed).

$$\frac{1-d}{\left(\frac{\rho_{0,1}^f}{\rho_{0,s}^f} - 1\right)d + 1} \approx \frac{\omega_0^2}{c_t^2} \frac{|u_z|_{x=0}^2}{\left|\frac{\partial u_z}{\partial x}\right|_{x=-}^2}. \quad (53)$$

In an alternate embodiment of the disclosure, the porosity may be obtained by using a nuclear logging device.

To summarize, in one embodiment of the disclosure, a magnetic field having components along an interface and parallel to the interface is generated by an electromagnet. A transducer generates shear vibrations that are parallel to the interface in two orthgonal directions. A transducer measures the velocity of the displacement of the interface in two orthogonal directions in the interface. The frequency of the magnetic field is varied until the velocity of the displacement in the two directions is the same. This defines a resonance frequency. Using the measured values of the velocity at the resonance frequency, the magnitude of the magnetic field and the resonance frequency, it is possible to determine the formation conductivity, the magnetic permeability of the formation and the electrokinetic constant of the formation. Optionally, by producing a stress along the interface and making a measurement of the gradient of the velocity along the interface, it is possible to determine the porosity of the formation. Optionally, the porosity may be determined using a porosity logging tool. The estimated resistivity properties and/or porosity of the earth formation are used to estimate the reservoir potential of the formation and in development of the reservoir using known methods.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation permeabilities may be recorded on a suitable medium and used for subsequent processing upon retrieval of the BHA. The determined formation permeabilities may further be telemetered uphole for display and analysis.

The invention claimed is:

1. A method of estimating a resistivity property of an earth formation comprising:
    generating a shear wave in an earth formation at an interface between a fluid and the formation;
    generating a static magnetic field at the interface having a first direction;
    varying a frequency of a second magnetic field having a second direction different from the first direction until a resonance condition is satisfied in the formation; and
    using at least one measurement of motion of the earth formation to provide the estimate of the resistivity property.

2. The method of claim 1 wherein generating the shear wave further comprises generating a pair of shear waves having substantially orthogonal polarization.

3. The method of claim 1 wherein the first direction is substantially orthogonal to the interface and the second direction is substantially parallel to the interface.

4. The method of claim 1 wherein the resonance condition further comprises a substantial equality of a velocity of motion of the formation in each of two directions normal to the interface, the method further comprising measuring the velocity of motion of the formation in the two directions.

5. The method of claim 1 wherein estimating the value of the resistivity property further comprises estimating a value of at least one of: (i) a formation conductivity, (ii) a permeability of the formation, and (iii) an elecktrokinetic constant of the formation.

6. The method of claim 5 further comprising:
    (i) generating a stress along the interface,
    (ii) measuring a gradient of a velocity of motion of the formation along the interface, and
    (iii) estimating a porosity of the formation.

7. The method of claim 5 further comprising using a porosity logging tool for estimating a value of porosity of the formation.

8. The method of claim 1 further comprising generating the shear wave and the magnetic field using a logging tool conveyed in a borehole in the earth formation.

9. An apparatus configured to estimate a resistivity property of an earth formation comprising:
    a transducer configured to generate a shear wave in an earth formation at an interface between a fluid and the formation;
    a magnet arrangement configured to generate a static magnetic field at the interface having a first direction and generate a time varying magnetic field at the interface in a second direction different from the first direction;
    a processor configured to:
    (i) vary a frequency of the time-varying magnetic field until a resonance condition is satisfied in the formation; and
    (ii) use at least one measurement of motion of the earth formation to provide the estimate of the resistivity property.

10. The apparatus of claim 9 wherein the first direction is substantially orthogonal to the interface and the second direction is substantially parallel to the interface.

11. The apparatus of claim 9 wherein the resonance condition further comprises a substantial equality of a velocity of motion of the formation in each of two directions normal to the interface, the apparatus further comprising a plurality of geophones configured to the velocity of motion of the formation in the two directions.

12. The apparatus of claim 9 wherein the processor is configured to estimate the value of the resistivity property by further estimating a value of at least one of: (i) a formation conductivity, (ii) permeability of the formation, and (iii) an elecktrokinetic constant of the formation.

13. The apparatus of claim 12 further comprising:
an additional transducer configured to generate a stress along the interface, and wherein the processor is further configured to estimate a porosity of the formation using a measurement of a gradient of a velocity of motion of the formation along the interface.

14. The apparatus of claim 12 further comprising a porosity logging configured to make a measurement indicative of a value of porosity of the formation.

15. The apparatus of claim 9 further comprising a logging tool configured to convey the transducer and the magnet.

* * * * *